H. E. R. THOMAS AND F. G. TAMS.
METAL WORKING LATHE.
APPLICATION FILED JAN. 19, 1918.

1,317,766.

Patented Oct. 7, 1919.
10 SHEETS—SHEET 1.

INVENTORS:
Harold E. R. Thomas
Frederich G. Tams
By Wm Wallace White
ATTY.

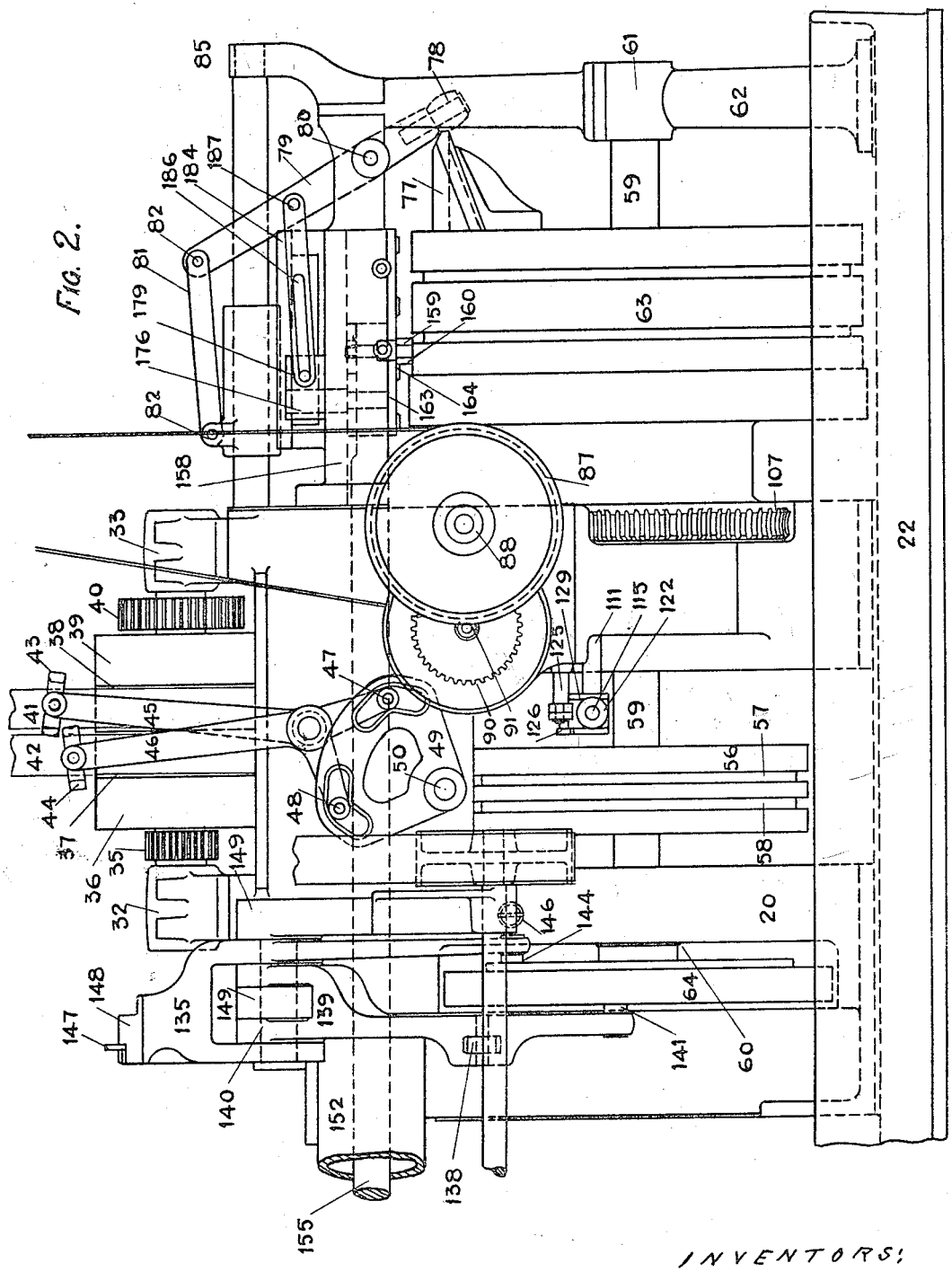

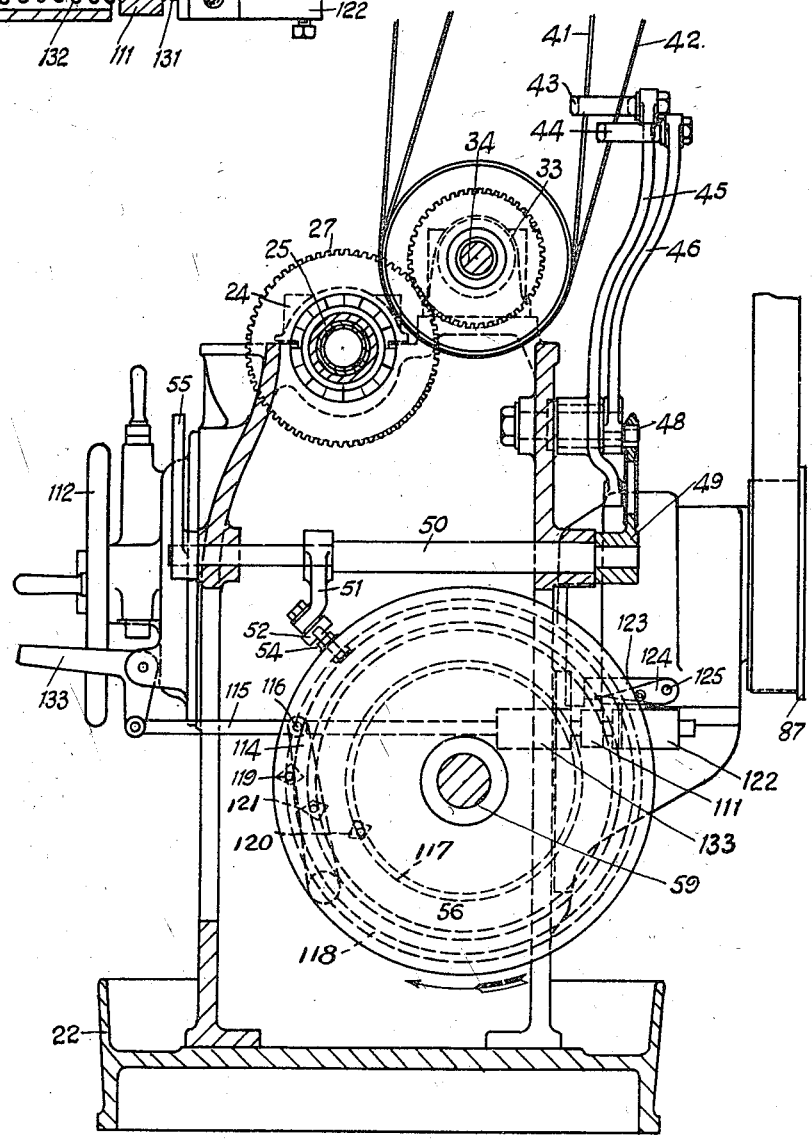

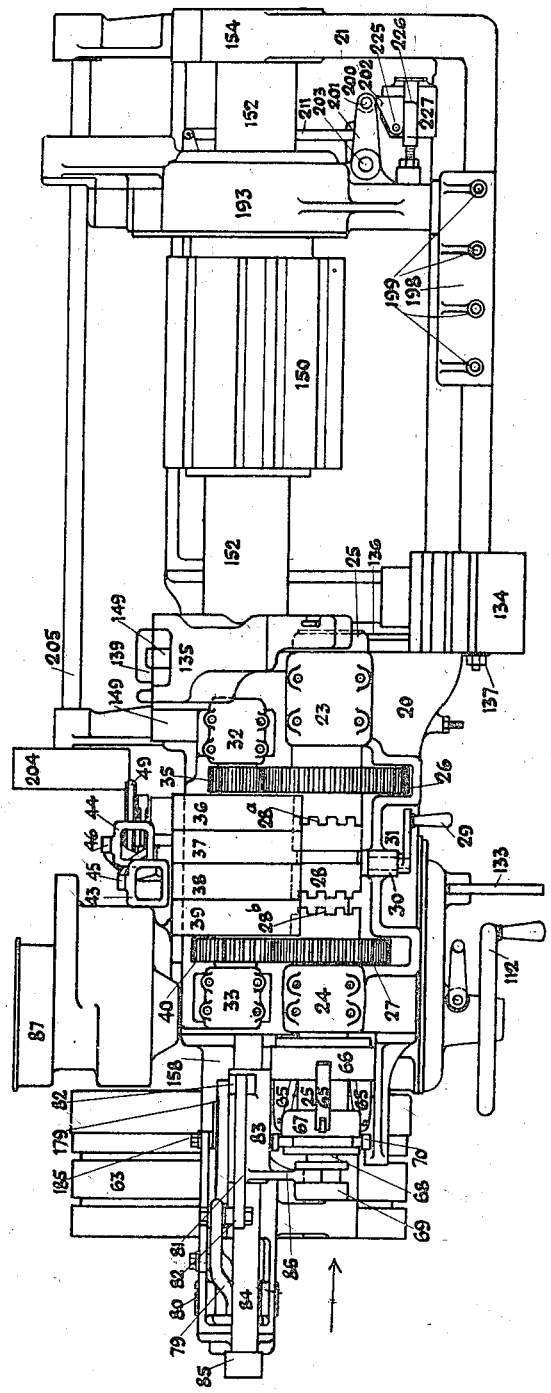

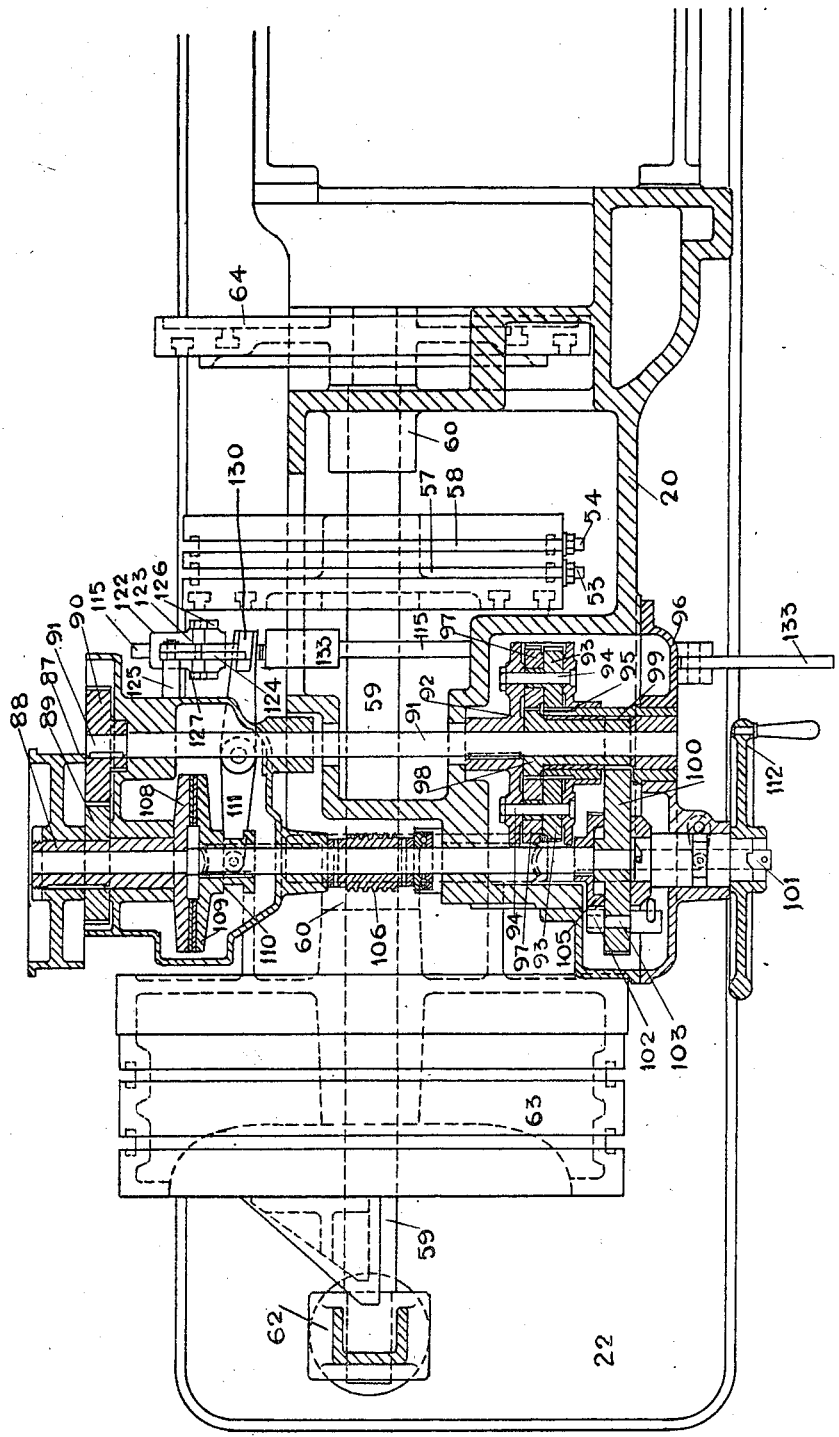

H. E. R. THOMAS AND F. G. TAMS.
METAL WORKING LATHE.
APPLICATION FILED JAN. 19, 1918.

1,317,766.

Patented Oct. 7, 1919.
10 SHEETS—SHEET 6.

INVENTORS
Harold E. R. Thomas
Frederick G. Tams
BY Wm Wallace White
ATTY

H. E. R. THOMAS AND F. G. TAMS.
METAL WORKING LATHE.
APPLICATION FILED JAN. 19, 1918.

1,317,766.

Patented Oct. 7, 1919.
10 SHEETS—SHEET 7.

INVENTORS!
Harold E. R. Thomas
Frederick G. Tams
by Wm. Wallace White
ATT'Y.

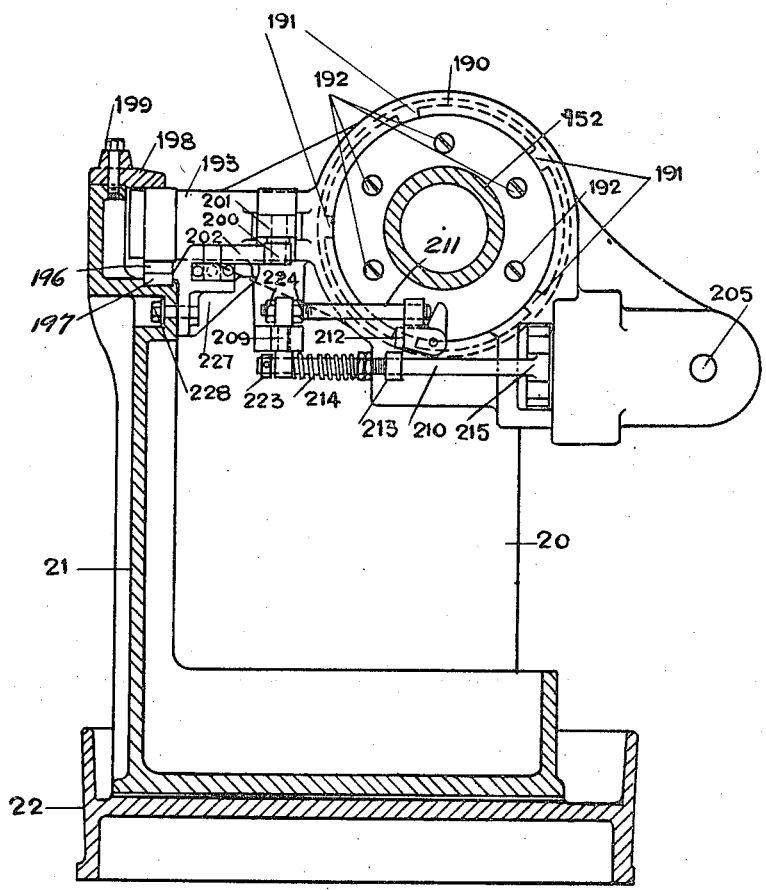

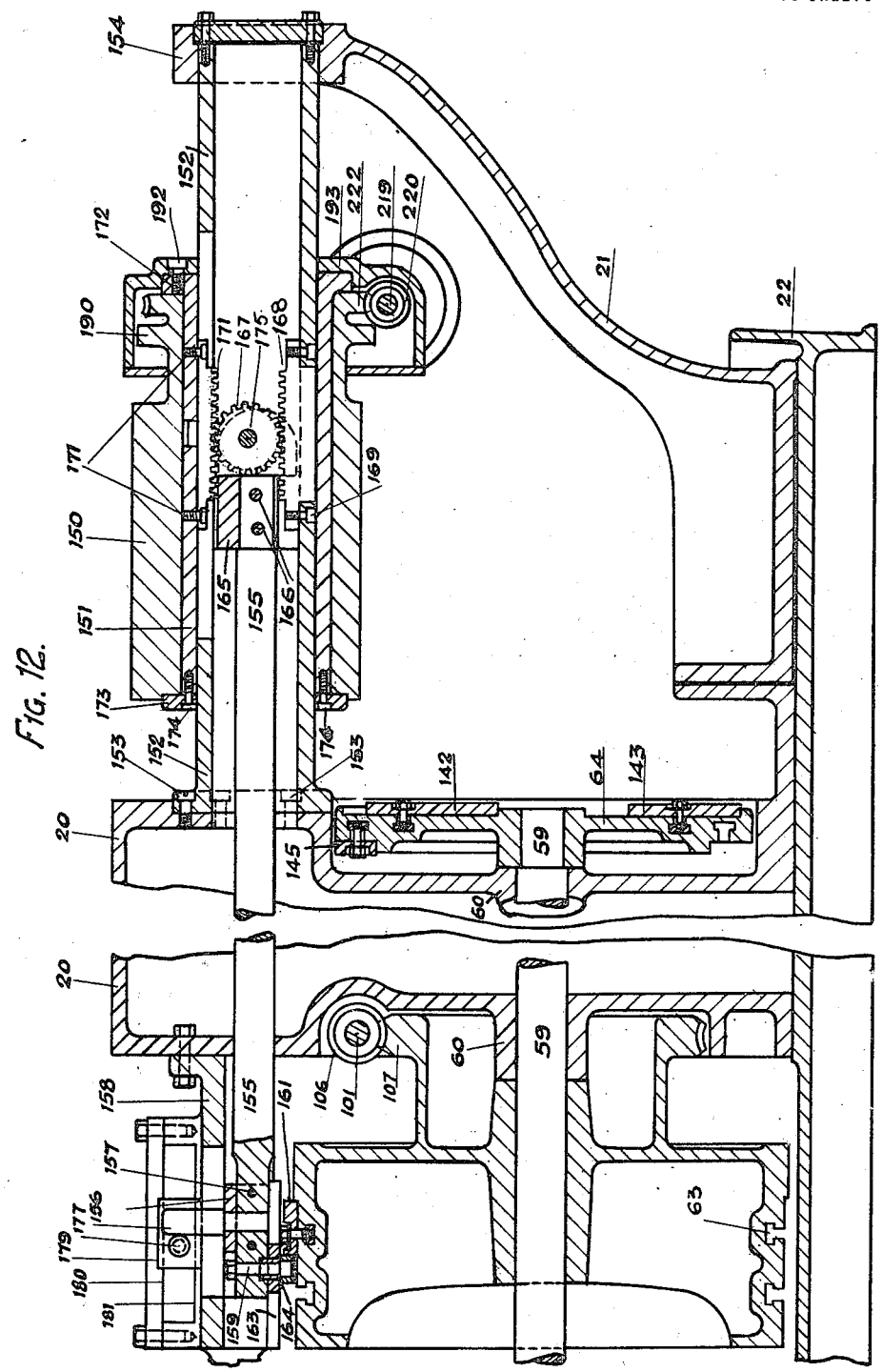

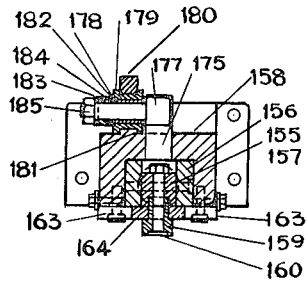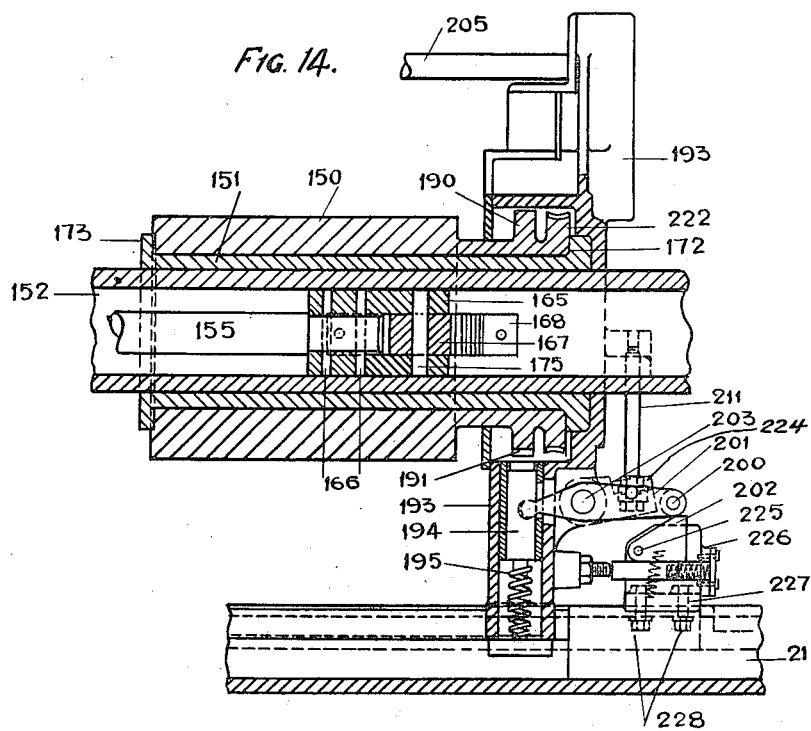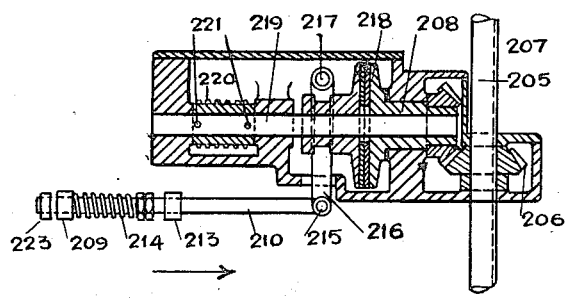

UNITED STATES PATENT OFFICE.

HAROLD ERNEST RAY THOMAS AND FREDERICK GEORGE TAMS, OF STOCKPORT, ENGLAND, ASSIGNORS OF ONE-THIRD TO CRAVEN BROTHERS (MANCHESTER) LIMITED, OF REDDISH, STOCKPORT, ENGLAND.

METAL-WORKING LATHE.

1,317,766.   Specification of Letters Patent.   Patented Oct. 7, 1919.

Application filed January 19, 1918. Serial No. 212,697.

*To all whom it may concern:*

Be it known that we, HAROLD ERNEST RAY THOMAS and FREDERICK GEORGE TAMS, both subjects of the King of Great Britain, residing at Vauxhall Works, Reddish, Stockport, in the county of Lancaster, England, have invented new and useful Improvements in Metal-Working Lathes, of which the following is a specification.

This invention relates to improvements in metal working lathes and particularly to that type of single spindle metal working machine, wherein a number of cutting tools are mounted or carried upon a turret adapted for their reception, this turret being operated in such a manner as to bring the cutting tools successively into position in order to operate upon the metal from which the piece required is to be produced, this metal being usually carried and rotated in a spindle, having its axis parallel to the axis of the aforesaid turret.

A defect found in machines of this character is that their construction and design limit the length of piece produced, and the scope of the machine is necessarily confined to the production of relatively short work.

The object of this invention is to obviate the defect and disadvantage above indicated and we accomplish this object by the improved construction and arrangement of parts which we will now describe.

According to our invention the turret is mounted in known manner upon a sleeve, upon a cylindrical support having its axis parallel to the single work spindle, and rigidly secured at one end to the main frame of the machine, and at its other end supported in a bearing, in an extension of the main frame.

The turret fits on the sleeve which in turn is made an accurate fit upon the aforesaid cylindrical support and is arranged to slide upon it longitudinally. This support is carried eccentrically to the single work carrying spindle and not concentrically with the axis of the work spindle carrier as in some types of known multiple spindle machines.

The turret is arranged with say five flat faces to which are bolted the cutting tools; the turret is itself a solid piece of metal of considerable weight, and there is no possibility of it being able to spring or deflect when the cutting tools bolted to its faces are subjected to stresses and strains due to heavy cuts and fast feeds, and therefore the cutting tools will register accurately with the work.

The invention is not limited to a turret with five faces, as a greater or less number of faces can be arranged but for the majority of work produced on this class of machine five faces are sufficient.

The turret is arranged to be rotated intermittently in the known manner to bring each of the five faces into operative position in succession.

According to our invention we provide means for imparting a multiplied or reduced movement to the turret and its rotating mechanism bodily along the cylindrical support in either direction relative to the work, through the medium of a drawbar carrying at one end, a gear meshing with a stationary rack fixed rigidly to the inner side of the cylindrical support, and with another rack fixed rigidly to the sleeve on which the turret is mounted.

At the reverse end the drawbar is actuated in the usual way by cams mounted upon the periphery of a drum, and mechanism is provided for rotating the cam drum at varying speeds, there being slow speeds operating in one direction when the tool is cutting and a constant fast speed when the tool is retiring after having performed its operation.

The mechanism for rotating the turret intermittently may comprise any suitable known arrangement such as a notched disk attached directly to the turret (each notch in the disk corresponding with one of the five tool faces) and a steel locking pin made to fit accurately into the notches engages each in succession, and is held there by a powerful spring.

The other motions of the machine, namely, direction and speed of the single work carrying spindle, opening and closing of the chuck and rotation of the cam drum, are common to machines of this class, and need no description, being governed by suitable mechanism causing all these parts to act synchronously with the motions imparted to the turret.

We employ special means for regulating the length of the metal bar or work automatically fed through the work carrying spindle, and this mechanism together with the above indicated means for imparting a multiplied or reduced longitudinal reciprocating movement to the turret according to our invention will be particularly described with reference to the accompanying ten sheets of drawings which illustrate our improved single spindle metal working lathe.

Fig. 2 is a rear elevation with the turret broken away.

Fig. 3 is an end sectional elevation showing the belt shipping and feed changing mechanism viewed from the right-hand end of machine.

Fig. 4 is an enlarged view partly sectional of the trip motion for the feed changing mechanism.

Fig. 5 is a plan view of the machine.

Fig. 6 is a sectional plan of the feed mechanism taken on the plane of the line A—B, Fig. 1.

Fig. 11 is a transverse vertical section showing the end view of the turret indexing mechanism.

Fig. 12 is a part longitudinal section with the central portion of the machine omitted, and showing a section through the turret, and the bar for actuating same.

Fig. 13 is a cross section through the turret actuating bar.

Fig. 14 is a sectional plan of the turret showing the mechanism for operating the locking pin.

Fig. 15 is a part section through the turret indexing mechanism.

Figure 1:
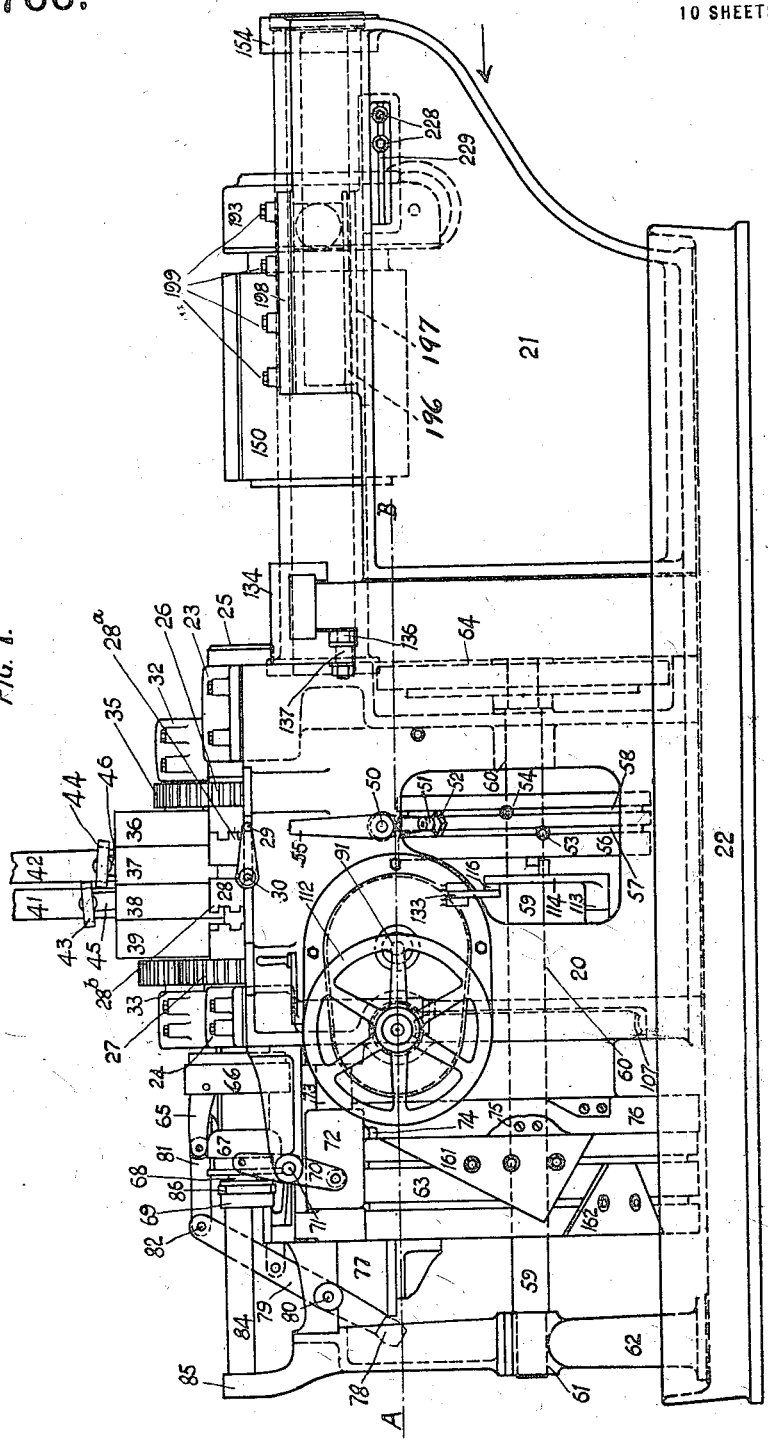
Figure 1 is a front elevation of the machine.

In these views 20 denotes the main frame of the machine and 21 an extension to the main frame 20, both of which rest on and are attached to a base plate 22 extending the entire length of the machine as shown in Fig. 1.

The main frame 20 is arranged for the reception of bearings 23 and 24 which carry the single work carrying spindle 25, and on the spindle 25 are mounted gears 26, 27 and a clutch 28.

The gears 26, 27 are free to rotate on the spindle 25 while the clutch 28 is keyed to but free to move longitudinally on spindle 25 and is operated manually by a handle 29 (Fig. 5), a shaft 30 and an eccentrically set roller 31, so that the clutch 28 can be made to engage through clutch teeth 28ª and 28ᵇ respectively with either of the gears 26, 27.

Bearings 32, 33 are also mounted on the main frame 20, and are arranged for the reception of a driving shaft 34, on which are mounted a gear 35, pulleys 36, 37, 38, 39 and gear 40.

The pulleys 37, 38 are loose upon the driving shaft 34, but pulley 36, gear 35, pulley 39 and gear 40 are all secured to the shaft 34.

There are two belts 41, 42 either of which can be made to engage with loose pulleys 37, 38 or fast pulleys 36, 39, by means of belt shippers 43, 44 on levers 45, 46 and on the ends of these levers are carried rollers 47, 48 which operate in slots of a cam plate 49 so arranged and adapted as to give the said belt shippers the necessary movement to shift the belts 41, 42 on to the pulleys 36, 37, 38, 39 as required in accordance with the speed desired for the work carrying spindle. Therefore when the belt 41 is on the fast pulley 39 and belt 42 is on the loose pulley 37, the work carrying spindle 25 can be rotated through gears 40, 27 or gears 35, 26 and clutch 28 Fig. 5; also when the belt 42 is on the fast pulley 35 and belt 41 on the loose pulley 38 the spindle 25 can be rotated through gears 35, 26 or 40, 27 and clutch 28, and as the belts 41, 42 are arranged to run at different speeds, four speeds can be imparted to the work carrying spindle 25.

The cam-plate 49 is carried on a shaft 50 Fig. 3 and the shaft 50 is operated by a lever 51 on which is secured a cam 52, the cam 52 and lever 51 being given sidewise movement in either direction by studs 53, 54 when required to shift the belts 41, 42.

The belt shippers 43, 44 can also be operated manually by a lever 55 Fig. 1.

The studs 53, 54 are connected in slots 57, 58 to a drum 56 Figs. 1 and 2 and can be fixed on any portion of the periphery of the drum 56 to take up any desired position.

The drum 56 is carried on a shaft 59 which is journaled in bearings 60 which are an integral part of the main frame 20, and the shaft 59 is also supported by another bearing 61 in a column 62 attached to the base plate 22.

On the shaft 59 are also mounted drums 63, 64 the uses of which will be explained hereinafter.

The work carrying spindle 25 together with the mechanism for opening and closing the chuck, and feeding the bar forward will now be described.

The spindle 25 Fig. 1 carried in the bearings 23, 24 attached to the top portion of the main frame 20, is fitted at its right hand end with a chuck or collet of the usual type, which is opened and closed by suitable means, operating through the spindle 25 by fingers 65 fulcrumed in the holder 66.

The fingers 65 are expanded by a spool 67 which rotates with but slides upon the spindle 25, and when the spool 67 is moved in the direction of the arrow Fig. 5 and engages the fingers 65, the chuck is closed and the work gripped; but when the spool is moved in the reverse direction the chuck is opened and the work released to permit the feeding forward of the material being operated upon.

Sliding inside the work carrying spindle 25 is a sleeve 68 to which is attached a grooved collar 69 and the sleeve 68 is provided with the usual means for feeding the bar or other work forward.

Figure 9:
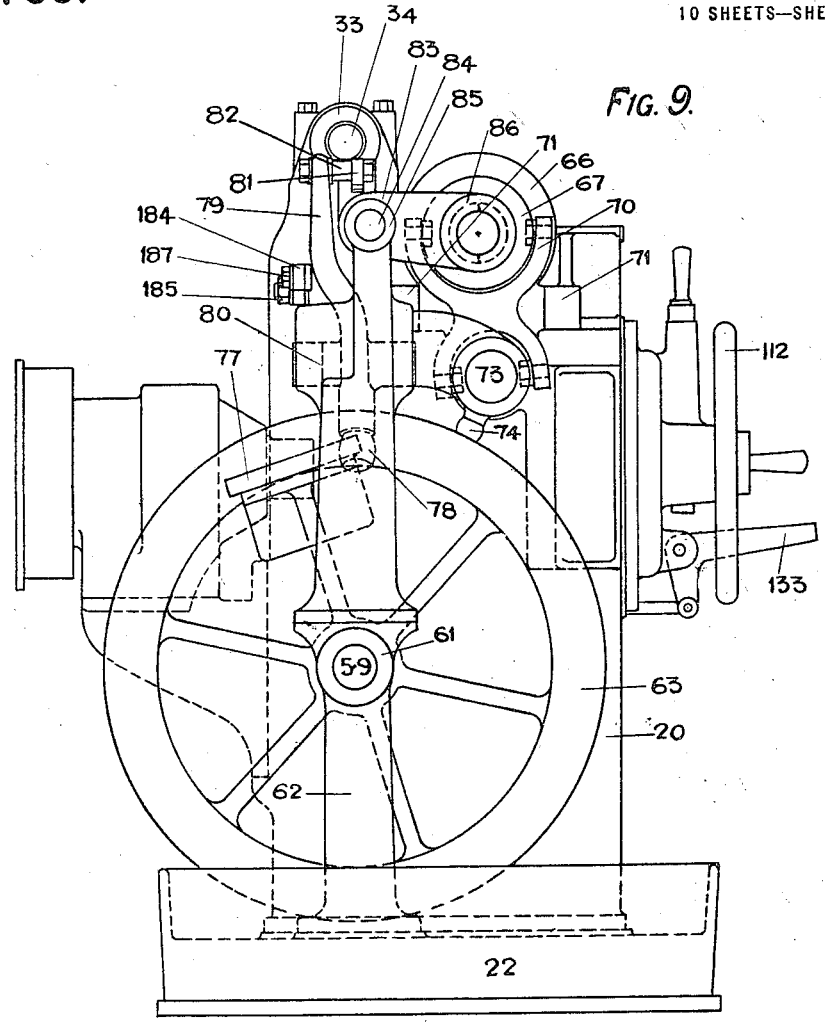
Fig. 9 is a left-hand end elevation of the machine.

The spool 67 is also grooved and to move it longitudinally the lever 70 is employed, this lever being fulcrumed at 71 and actuated by a sliding sleeve 72 supported on a fixed shaft 73, Fig. 9.

To the sliding sleeve 72 is attached a roller 74, Fig. 9 this roller giving longitudinal movement to the sleeve 72 by means of cams 75, 76 attached to the periphery of the cam drum 63.

On the left-hand side of the cam drum 63, Fig. 1 is attached a cam 77 which operates against a roller 78 on a lever 79, which is pivoted at 80 and is connected by a rod 81 through studs 82 to a sleeve 83 which slides on a shaft 84 attached to the main frame 20 and supported at 85 by the column 62 Figs. 1 and 5.

The sleeve 83 is provided with a fork 86 Fig. 9, which engages with the grooved collar 69 attached to the sleeve 68 Fig. 5.

When the sleeve 83 is moved in the direction of the arrow Fig. 5 by the lever 79 and cam 77, the feed tube 68 moves in the same direction carrying with it the metal being operated upon, thereby effecting the feeding forward of the metal through the chuck. The mechanism for opening the chuck is arranged to act in unison, and the cam 76 on the drum 63 then closes the chuck through the mechanism described.

The foregoing mechanisms for driving the work carrying spindle, opening and closing the chuck and feeding forward the work are well known and in themselves form no part of our present invention, but may if desired be substituted by other known mechanisms having or performing the same functions.

The means for rotating the shaft 59 and with it the drums 63, 56, 64 (generally known as a feed motion) will now be described, together with the means for securing variation in speed of the said shaft and drums.

Reference to Fig. 6 shows a pulley 87 attached to a sleeve 88 to which is keyed a gear 89 driving a gear 90 fast upon a shaft 91.

On the shaft 91 is keyed a flange 92 to which are attached gears 93, carried on studs 94 and the gears 93 revolve around a fixed gear 95 securely fastened against rotation to a cover plate 96 attached to the main frame 20.

Secured to the gears 93 are gears 97, which engage a compound gear 98 of which the part 99 engages a gear 100 carried on the feed shaft 101.

Figures 7, 8:
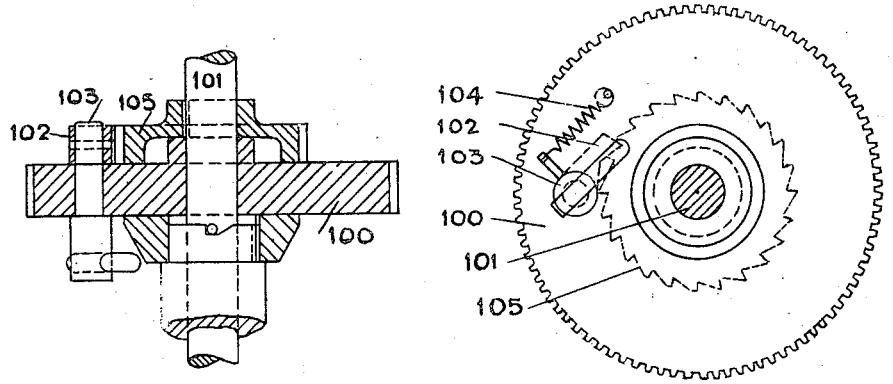
Figs. 7 and 8 are enlarged views of the ratchet and pawl feed mechanism.

The gear 100 is free to rotate on the shaft 101, but in order to effect rotation of the shaft 101 the gear 100 is provided with a pawl 102 carried on a stud 103 as shown in the enlarged views Figs. 7 and 8 from which it will be seen that the pawl is held by a spring 104 in gear with a ratchet 105 secured on the shaft 101.

The mechanism described is well known as an epicyclic gear for imparting a very slow speed of rotation to the feed shaft 101, owing to the gears 93, 97 having different numbers of teeth, but obviously the gears 93 are equal, and the gears 97 are also equal.

On the shaft 101 is pinned a worm 106 which meshes with a worm wheel 107 attached to the drum 63 Fig. 1 and a slow speed of rotation is thereby imparted to the shaft 59 and cam drums 63, 56, 64. Varying speeds of rotation to the cam drums 63, 56, 64 can be obtained by adapting change gears of different ratios in place of the gears 89, 90 Fig. 6.

The fast speed of rotation to the shaft 59 and cam drums is obtained as follows:—

Reference to Fig. 6 will show that integral with the sleeve 88 is a flange 108 and on the shaft 101 is shown a similar flange 109, which is keyed to, but free to slide longitudinally on the shaft 101.

The flange 109 is provided with a groove 110, which engages with a roller on the end of a lever 111, and this lever 111 is caused to move the flange 109 either in or out of contact with the face of the flange 108.

The faces of the flanges 108, 109 are provided with leather or other suitable substance to effect their rotation together when the flange 109 is brought into frictional contact with the flange 108.

It will therefore be seen that when the flanges 108, 109 are brought into frictional contact, a direct drive from the pulley 87 through the sleeve 88 to the worm 106 operating the worm wheel 107 (Figs. 1 and 2) attached to the drum 63 is obtained, and as this rotates the shaft 101 and ratchet 105 at a higher speed than the gear 100 the pawl 102 is made inoperative.

The shaft 101 can also be rotated manually by a hand wheel 112 and suitable means are provided for disengaging the pawl 102 from the ratchet 105 so that the shaft 101 can be rotated manually by the hand wheel 112 in either direction.

In machines of this type a feed motion combining an epicyclic gear with a ratchet and pawl is generally used, but the desired motion can be obtained in various other ways not necessarily using a ratchet and pawl, and the feed motion herein described is not in itself a feature of the present invention, but is simply introduced in order to show an operative combination, and may be substituted by any other suitable known feed motion if desired.

A convenient means for moving the friction clutch operating lever 111 to operate the sliding flange 109 will now be described, but this again in itself forms no part of our invention.

Reference to Fig. 3 shows the drum 56 viewed in the direction of the arrow Fig. 1 and at 113 is pivoted a lever 114 Fig. 1 which is connected to a rod 115 at 116.

On the left hand face of the drum 56 are two grooves 117, 118 in which are fastened two cams 119, 120.

The cam drum 56 rotates in the direction of the arrow Fig. 3 and it will therefore be seen that the cam 119 when brought in contact with a cam 121 on the lever 114, moves the lever 114 and with it the rod 115 to the right, and in the reverse direction when the cam 120 operates against the cam 121 on the lever 114.

The rod 115 passes through spring boxes 122, 133 and there are two pawls 123, 124 carried on a stud 125 Fig. 6, the pawls 123, 124 being each provided with a roller 126, 127 operated upon respectively by cams 128, 129 fastened to the spring box 122.

The lever 111, Fig. 6, has inserted at its end a hardened steel piece 130, of rectangular section.

The movement of the rod 115 by the cams 119, 120 Fig. 3 causes compression of springs 131 or 132 according to the direction of this movement, while the lever 111 is held against movement by the pawl 123 or 124 being in contact with the face of the piece 130 until the continued movement of rod 115 lifts the pawl 123 out of engagement with piece 130 by roller 126 and cam 128 or the pawl 124 out of engagement with piece 130 by roller 127 and cam 129, as the case may be.

The function of the pawl 123 or 124 is to retain the sliding flange 109 either in or out of frictional contact with the flange 108.

The rod 115 can be operated manually by a lever 133 Fig. 3.

The operations of forming and cutting-off will now be briefly indicated, but being common to machines of this class need no detailed description.

Fig. 5 shows in plan the forming slide 134 and cut-off arm 135.

Figure 10:
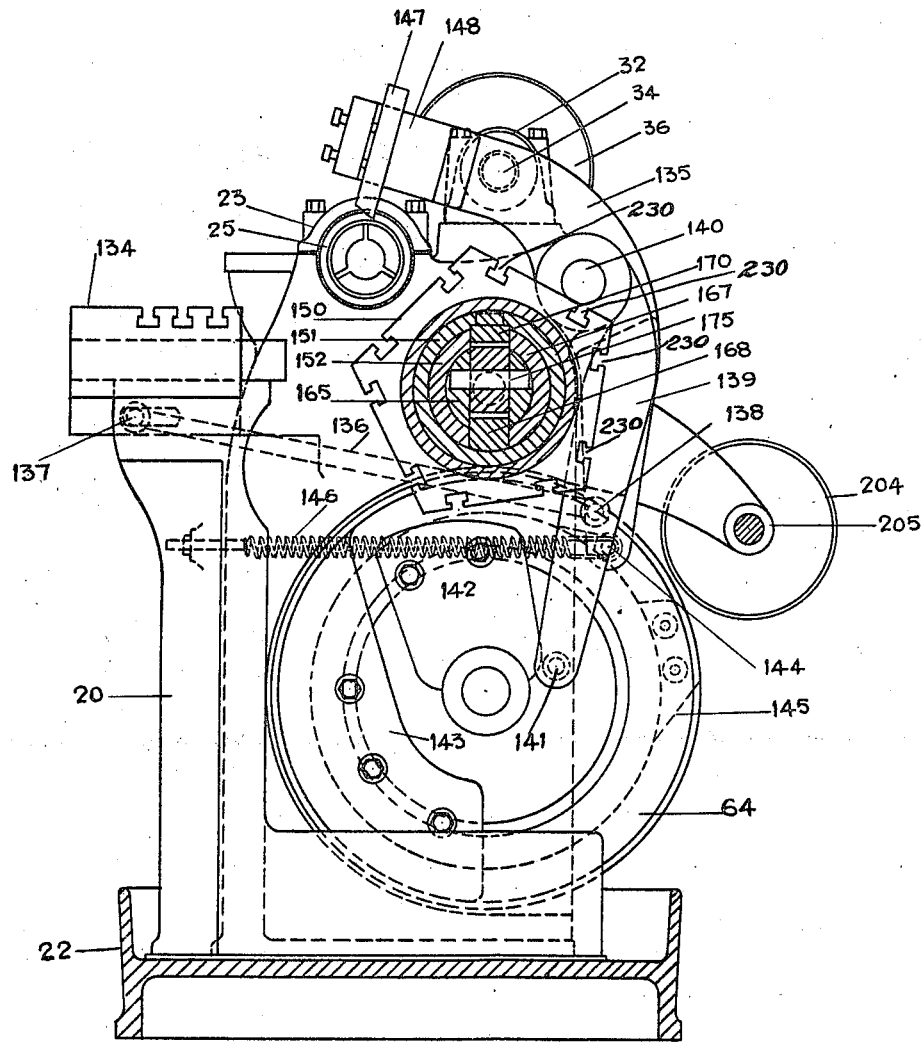
Fig. 10 is a right-hand end sectional elevation of the machine.

The forming slide 134 is required to move in a plane at right angles to the axis of the work carrying spindle 25, Fig. 5 and is moved by a pull bar 136 Fig. 10, attached to the forming slide at 137, and pivoted at 138 on a swinging arm 139, carried on a stud 140 on the main frame 20 in bearing 149.

The function of the forming slide 134 Figs. 1, 5, and 10 is to carry cutting tools usually called "forming tools" to form into any desired shape the bar of metal being operated upon, and a forming slide of this description is common to machines of this class, and is sometimes called a cross slide.

At the lower end of the arm 139 are fixed a roller and stud 141 which are actuated by a feed cam 142 and return cam 143 both of which are bolted to the right hand side of the drum 64, and the movement imparted to the forming slide 134 is clearly indicated.

The cut-off arm 135 is also carried on the stud 140 and at the lower end of the arm 135 are fixed a roller and stud 144 Fig. 2, which are actuated by a feed cam 145, Fig. 10, bolted to the left hand side of the drum 64, Fig. 2.

The feed cam 145 causes the tool 147 held in a holder 148 on the arm 135, to descend and cut off the finished work, and a spring 146 returns the arm 135 to its inoperative position.

We will now describe the means for actuating the turret and the mechanism for rotating the same according to our invention.

Referring to Fig. 12 the turret 150 is carried upon a non-rotating sleeve 151, and the sleeve 151 is in turn carried upon a stationary cylindrical support 152 eccentric but parallel to the axis of the single work carrying spindle 25 and rigidly secured at its left hand end by screws 153 to the main frame 20, and at its right hand end rigidly supported at 154 in the extension 21 of the main frame 20.

The cylindrical support 152 has a drawbar 155 passing through part of its length, and the left hand end of this drawbar is rectangular in section, and is secured to a slide 156, Fig. 13, by pins 157, and the slide 156 is fitted to slide longitudinally in the draw-bar bracket 158 secured to the main frame 20.

The drawbar 155 is therefore held against rotation, but is free to slide longitudinally in the known way. The drawbar slide 156 is provided with a pin 159, and on this pin is carried a roller 160, which is arranged to come in contact with the operative surfaces of cams such as 161, 162 Fig. 1 and Fig. 12, which cams are bolted to the periphery of the cam drum 63 in the usual manner as well understood.

It will be seen from the above description that on rotation of the cam drum 62 the drawbar 155 will receive a reciprocatory motion, governed by the angle of the cams such as 161, 162, bolted to the cam drum 63.

The cam 161 gives a left hand, and the cam 162 a right hand longitudinal movement to the drawbar 155, and the lateral thrust of these cams is taken by strips 163 through a roller 164 carried on the pin 159 of the drawbar slide 156.

The right hand end of drawbar 155 is located within the cylindrical support 152, and for the purposes of our invention is adapted for the reception of a fork 165, securely attached to the drawbar 155 by pins 166, and within this fork 165 carried on a pin 175 is located a gear 167 which meshes or gears with a stationary rack 168, securely fastened to the interior of the cylindrical support 152 by screws 169.

Diametrically opposite the stationary rack 168 is another but movable rack 170 also meshing with the gear 167 and this rack 170 is rigidly connected to the sleeve 151 by screws 171.

On the sleeve 151 is mounted the turret 150 which is free to rotate on the sleeve 151, but cannot move longitudinally as it is held against a shoulder 172 by a retaining ring 173 secured to the sleeve 151 by screws 174.

Having reference again to the left hand end of the drawbar 155, Fig. 12, it will be seen from the above description that the reciprocating movement imparted to the drawbar 155 by the cams 161, 162 will be transmitted to the turret 150 by the connections described, but the movement so transmitted to the turret 150 will be greater than that imparted to the drawbar 155 by cams 161, 162. For example, should the cams 161, 162, impart a movement of nine inches to the drawbar 155 the turret 150 will be moved on the cylindrical support 152 a distance of eighteen inches through the combined action of the pinion 167, and stationary and moving racks 168, 170.

Having clearly shown that for a movement of eighteen inches longitudinally of the turret 150, a cam of only nine inches rise is required, an obvious advantage is that smaller cams can be used, occupying considerably less space on the cam drum 63 as hitherto in machines of this class to impart a movement of eighteen inches to the turret a cam of eighteen inches rise would be necessary.

For instance:—If to obtain a given rate and length of travel longitudinally to the turret 150 a cam rising to nine inches at an angle of 45° would be necessary, the same longitudinal travel would be imparted to the turret 150 by a cam rising to four and a half inches at an angle of approximately 27° if employed in combination with the pinion and racks as described.

Varying rates of travel to the turret 150 can be obtained by using feed cams similar to 161, Fig. 1 but constructed with different angles of rise.

Again instead of a multiplied movement as described, a diminished movement could be imparted to the turret by varying the arrangement of the stationary and movable racks, or by the use of a compound intermediate gear carried in the fork 165, on pin 175, and meshing with the stationary rack 168, securely fastened to the interior of the cylindrical support 152 by screws 169.

In order to obtain a diminished longitudinal movement of the turret the movable rack 170 would not be diametrically opposite the stationary rack 168, but would be on the same side of the center of the gear 167 as the stationary rack 168.

The compound gear 167 would be of two diameters, the larger diameter meshing with the stationary rack 168, and the smaller diameter with the movable rack 170 which is rigidly connected to the sleeve 151 by screws 171.

Further we reserve the right to impart an equal movement to the turret when required by the use of a simple connecting rod or other known means.

The drawbar 155 besides imparting movement to turret 150 has another function which we will now describe.

Referring to Fig. 12 it will be seen that the lefthand end of drawbar 155 is provided with a stud 176 which comes into contact with a bolt or pin 177 when the drawbar 155 is actuated as previously described by the cam 161 in a left hand direction.

On the bolt 177 is provided a distance bush 178 carried on a sliding block 179 which is free to move longitudinally on guide ways 180, 181. Also carried on the bolt 177 are two washers 182, 183 Fig. 13 and located between these two washers is a connection rod 184.

The washers 182, 183, rod 184, distance bush 178 and bolt 177 are all clamped together by a nut 185, but the distance bush 178 is free to rotate in the sliding block 179.

The function of the connection rod 184 is to effect movement in a reverse direction to the arrow Fig. 5 of the forked sleeve 83 Fig. 5. The rod 184 is connected to the lever 79 at 187 and to the lever 79 as previously described is connected the rod 81 at 82 in turn connected to the forked sleeve 83 Fig. 5 sliding on a shaft 84, and moving with the grooved collar 69 attached to the sleeve 68 Fig. 1. The rod 184 is provided with a slot 186 and the position, which the bolt 177, distance bush 178 and washers 182 occupy when clamped in the slot 186 in the rod 184 determines the amount of movement in a reverse direction to the arrow Fig. 5 that is imparted to the sleeve 83 Fig. 5.

The sleeve 68 is provided with a known frictional device (not shown) which allows movement to the sleeve 68 in a reverse direction to the arrow Fig. 5, the frictional device sliding upon the bar or work, which is meanwhile held rigidly against longitudinal movement by the chuck in the work carrying spindle 25 previously described; but the frictional device is incapable of movement in the direction of the arrow Fig. 5 when the chuck is closed upon the bar or work, When however the chuck is opened to release the bar or work, the sleeve 68 is free to move in the direction of the arrow, carrying with it the bar or work through the chuck, and thereby feeding forward a fresh length of bar to be operated upon, this feeding being performed by cam 77 and lever 79 Fig. 1 and Fig. 2 as previously explained.

Any suitable known mechanism for rotating the turret 150 and bringing its various faces into operative position in succession as required may be employed and for example we will describe one such mechanism as follows:—

Reference to Fig. 14 will show that the turret 150 is provided with a disk 190 which disk has on its periphery a number of notches 191, Fig. 11, corresponding in number to the faces of the turret 150.

Secured to the sleeve 151 by screws 192, Fig. 11 is a bracket 193 in which is carried a locking pin 194 which engages successively as required with the notches 191.

This locking pin 194 is held in engagement with a notch 191 by a spring 195, and holds the turret 150 against rotation.

The bracket 193 is supported in the extension 21 to the main frame 20 by adjustable gibs 196, 197 and a plate 198 which is secured by bolts 199, Fig. 1, but the bracket 193 is free to slide longitudinally.

When the turret 150 is moved longitudinally in a right-hand direction by the drawbar 155 actuated by the cam 162 Fig. 1 the roller 200 carried on a lever 201 pivoted at 203 in the bracket 193 is brought into contact with a cam 202, and the other end of the lever 201 is engaged in a slot in the locking pin 194, Fig. 14 and the continued movement of the bracket 193 and with it the lever 201 and cam 202, causes a withdrawal of the locking pin 194 from engagement with a notch 191 allowing the turret 150 free rotation to the next operative position required.

The means for rotating the turret will now be described.

Reference to Fig. 5 shows a pulley 204 attached to a shaft 205 driving a gear 206 (Fig. 15) which is keyed to the shaft 205 but is free to move longitudinally thereon. The gear 206 engages a gear 207 attached to a flanged sleeve 208 carried in the bracket 193.

The lever 201 has an extension, see Fig. 11, on which are connected at 209, rods 210, 211 and the movement imparted to the lever 201 by the cam 202, causes a corresponding movement of the rods 210, 211. The rod 210 is however held against movement by a latch 212, acting against a collar 213 fixed to the rod 210 thereby causing compression of a spring 214, until the continued movement of the lever 201 brings the end of the rod 211 into contact with the latch 212, as shown in Fig. 11, and moves it, thereby effecting release of the collar 213 and allowing the spring 214 to move the rod 210 instantly in the direction of the arrow Fig. 15.

Referring still to Fig. 15 the rod 210 is shown connected at 215 to a lever 216 fulcrummed at 217, the lever 216 being in contact with a grooved flange 218, which is keyed to a shaft 219, but is free to move thereon longitudinally to effect contact with the flanged sleeve 208.

The faces of the friction flanges 218, 208 are provided with leather or other suitable substance to effect their rotation together, when brought into contact one with the other.

Frictional contact having been made the shaft 219 is caused to rotate and on the shaft 219 is secured a worm 220 by pins 221, in gear with a worm wheel 222, Figs. 12 and 14 attached to the turret 150 which is rotated.

Rotation of the turret 150 continues until the locking pin 194 engages any notch 191 through the action of the spring 195 when the lever 201 together with the rods 210, 211 is moved in the reverse direction to the arrow Fig. 15 by means of a collar 223, and nut 224 thereby withdrawing the friction flange 218 from contact with the flange 208 and so stopping the rotation of the turret 150.

This movement of the lever 201 connected at 209 by nuts 224 (Fig. 11) to the rod 211 allows the latch 212 to fall and effect contact with the face of the collar 213 on the rod 210 making further contact between the friction flanges 218, 208 impossible until the locking pin 194 is again withdrawn as described.

The function of the collar 213 is to prevent movement of the rod 210 and contact of the friction flanges 218, 208 until the locking pin 194 is quite free from engagement with its notch 191 when the extension of the compressed spring 214 effects quick and decisive contact between the friction flanges 218, 208 as required.

Referring again to Fig. 14 it will be seen that the cam 202 is pivoted at 225 and is held against movement by the raised portion of a slide 226, Fig. 5 and Fig. 14 both the cam and the slide being fitted on an adjustable bracket 227 which is fastened to the extension 21 of the main frame 20 by bolts 228 Fig. 14, and reference to Fig. 1 will show that the bracket 227 is adjustable, longitudinally in a slot 229 on the extension 21, so that by this adjustment and the mechanism previously described, the turret 150 can be made to rotate to its next operative position, on any portion of its longitudinal movement in the right hand direction governed by the position assigned to the bracket 227.

By the combination of old and new mechanisms herein described the turret 150 can be caused to rotate immediately the cutting tools have cleared the bar or work being operated upon, thereby effecting a considerable saving of space on the cam drum 63 Fig. 1 consequently permitting more feed cams 161 and return cams 162 to be used, and a correspondingly greater amount of work performed in one cycle by the cutting tools fixed to the faces of the turret 150.

There are many other advantages and improvements in our improved machine to which attention is called, as for instance:—

The faces of the turret 150, Fig. 10, are each provided with two undercut grooves 230 parallel to the axis of the turret and are provided for the reception of bolts, the heads of which engage the undercut portion of the grooves 230 and these bolts are provided with nuts to clamp down on the turret faces the various tools required for use.

The two undercut grooves on each face allow cutting tools to be fastened on either side of the bar or work being operated upon, without one tool interfering with the other, or if great rigidity is required the tools can be clamped in both grooves by say four bolts if desired.

Hitherto in machines of this class it has been usual for only one undercut groove to be provided for each face, and all cutting tools having to be clamped in this one groove, the result is that at times, when a number of tools are required to operate together, considerable difficulty is experienced in designing and locating them for reception on faces provided with only one groove, and this difficulty is practically overcome by the improved construction of our turret as described.

There are many parts of the machine which are common to both hand operated and automatically operated power-driven machines.

Our invention is not limited to the precise details of construction as illustrated and described, and various changes and substitutions of known mechanisms giving the same operative combination may be made therein without departing from the characteristic features of the invention as hereinbefore described and as pointed out in the claims.

What we claim and desire to secure by Letters Patent of the United States is:—

1. In an improved metal working lathe of the single work spindle type and comprising a rotary turret, a non-rotatable reciprocating drawbar within the turret, means for imparting a variable, longitudinal, reciprocating movement to the turret and including gearing between said turret and drawbar.

2. In an improved metal working lathe of the single work spindle type, the combination with a sleeve, a turret mounted on said sleeve, and a reciprocating drawbar within the turret, of a pair of racks, a rotary gear wheel carried by the drawbar and meshing with said racks, one of said racks being stationary and the other secured to said sleeve for the purpose of imparting a multiplied longitudinal movement to the turret relatively to the movement of the drawbar.

3. In a metal working lathe of the single work spindle type, the combination, a rotary turret, a non-rotatable reciprocating drawbar located within the turret, and means for utilizing the reciprocating movement of the drawbar for determining the length of the work to be operated upon by the tools adapted to be secured to the faces of the rotary turret.

In testimony whereof we have signed our names to this specification in the presence of two subscribing witnesses.

HAROLD ERNEST RAY THOMAS.
FREDERICK GEORGE TAMS.

Witnesses:
S. W. GILLETT,
HERBERT ROWLAND ABBEY.